UNITED STATES PATENT OFFICE.

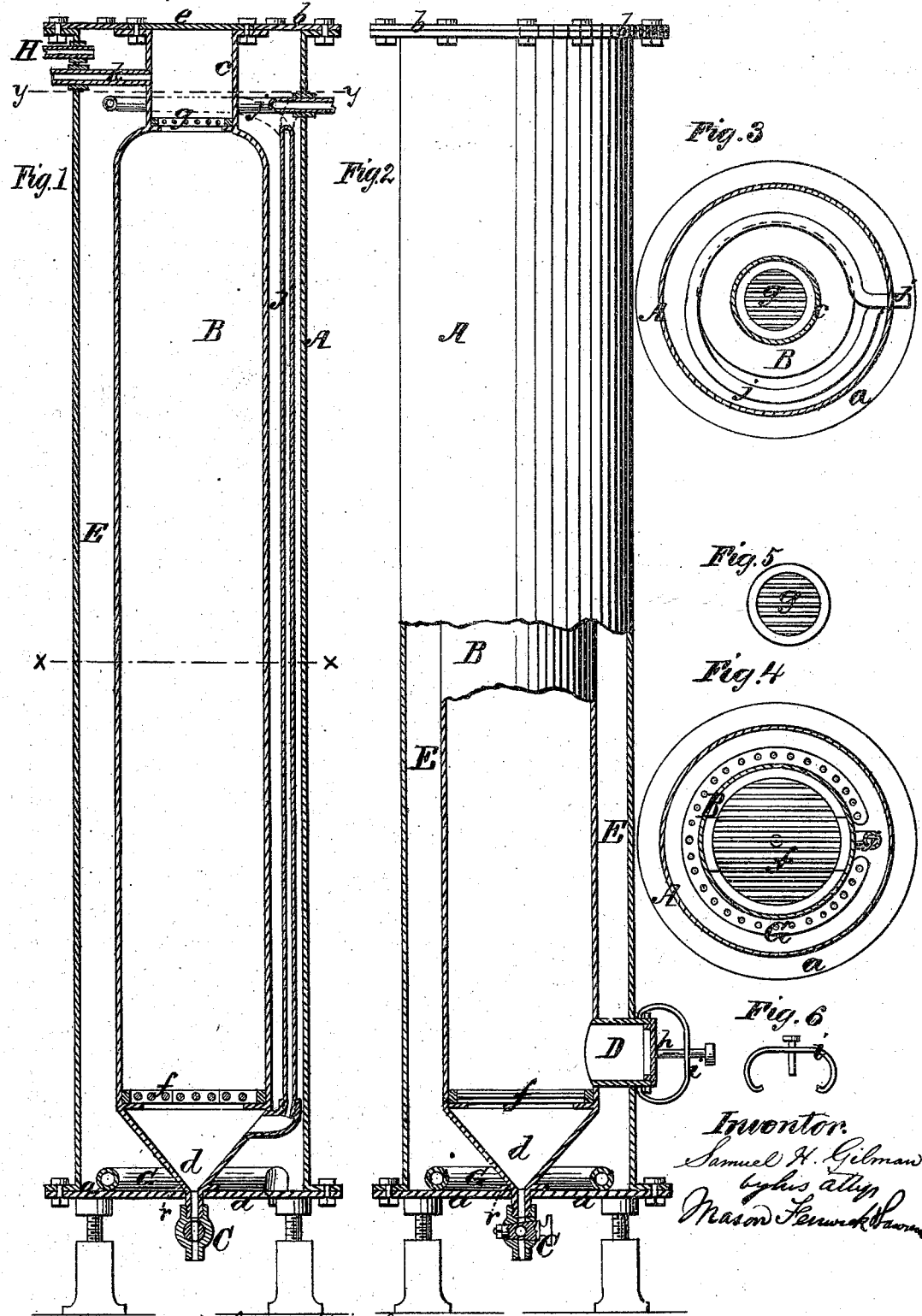

SAMUEL H. GILMAN, OF NEW ORLEANS, LOUISIANA.

IMPROVEMENT IN APPARATUS FOR REFINING SUGARS AND SIRUPS.

Specification forming part of Letters Patent No. 143,754, dated October 21, 1873; application filed September 26, 1873.

*To all whom it may concern:*

Be it known that I, SAMUEL H. GILMAN, of New Orleans, in the parish of Orleans and State of Louisiana, have invented a new and useful Apparatus for Separating Foreign Substances from Saccharine Solutions in the Process of Refining Sugar and Sirups; and I do hereby declare that the following is a full, clear, and exact description of the same, reference being had to the accompanying drawings forming part of this specification, in which—

Figure 1 is a vertical central section of my improved apparatus. Fig. 2 is a view at right angles to Fig. 1, showing the apparatus part in section and part in elevation. Fig. 3 is a horizontal section in the line $y\ y$ of Fig. 1. Fig. 4 is a similar section in the line $x\ x$ of Fig. 1. Fig. 5 is a detail view of the upper strainer. Fig. 6 is a detail view of one of the clamps for the man-hole cover.

Similar letters of reference in the different figures indicate like parts.

The object of my invention is to heat the saccharine or other solutions to be purified to any desired temperature before it reaches the purifying agent, (bone-black, for instance;) also, to keep it at any desirable and an unvarying temperature while in contact with the said agent; also, to cause a deposit of insoluble matter in a chamber before the solution enters the chamber which contains the purifying agent; also, to provide for drawing off such insoluble deposit at any time during the process without interfering with the constant working of the apparatus, and by the same channel facilitate the washing down of the purifying-chamber, all as will be hereinafter explained.

To enable others skilled in the art to make and use my invention, I will proceed to describe the same with reference to the drawings.

A and B represent two upright cylindrical vessels, one within the other. The outer cylinder A is closed at the bottom by a cast-iron head, $a$, bolted firmly to it, and at top by a similar annular head, $b$, as shown. This cylinder, when used, may be set upon jack-screws for convenience of keeping it level, and also to afford room for the necessary pipe-connections and cocks. The inner cylinder B is shaped at its upper end $c$ very much like the shoulder-neck of a bottle, and at its lower end $d$ has the form of an inverted cone, and both ends of this cylinder are open. The said upper end of the cylinder B is flanged and bolted to the under side of the annular head $b$ of the cylinder A, its mouth coming just within the margin of the annulus of said head, and being closed by a cap, $e$, which is firmly bolted to the head $b$, as shown. The lower terminus of the conical portion of the cylinder B is extended downward in form of a hollow cylinder through the head $a$ of the vessel A, and is screw-threaded to receive a draw-off cock, C, as represented. A flange, $r$, sustains the vessel B upon the head $a$. At the base of the inverted cone a strong grating, $f$, is constructed, and upon this grating a fine brass wire-gauze is to be placed to serve as a strainer. A similar grating, $g$, with wire-gauze covering it, is placed at the base of the bottle-neck-shaped upper portion of the cylinder B, as shown. For access to the cylinder B, through the side of cylinder A a man-hole, D, is constructed, and the same is closed by a cover, $h$, fastened by a screw-clamp, $i$, as shown in the drawings. Through this man-hole the bone-black or purifying agent may be withdrawn, and through the opening closed by the cap $e$ the said agent may be introduced into the cylinder B after the cover $e$ and grating $g$ are temporarily lifted out of position. The inner cylinder stands within the outer cylinder in such manner that there is an annular chamber, E, all around it. This chamber or space is for containing the water or fluid for heating the saccharine juices or other solutions in their passage to the filtering-chamber B. Within this chamber, from near the top to the conical terminus of vessel B, a feed or saccharine-juice-supply pipe, $j$, is arranged, the said pipe coming in through the upper portion of the outer vessel A, making one or more coils, and then running down to and entering the conical portion of the vessel B, as shown. The pipe $j$ leads from an ordinary force-pump, (not shown,) by which the saccharine or other solutions are forced into and through the purifying apparatus, and out into a receiver. For the purpose of discharging the saccharine solutions after they are purified from the vessel B into a receiver, a pipe, $k$, is passed through the vessel A into the neck portion of the vessel B, as shown; and for the purpose of heating water which is placed in the chamber E, a steam "blow-up" pipe, G, which is finely perforated, is coiled and arranged upon the inner surface of the head a, and its end carried through said head and connected with an ordinary steam-generator. There may be another pipe for hot water at the top of the cylinder A in said chamber E. H is an overflow-pipe for the chamber E. A thermometer is placed on the cylinder A at any convenient point for indicating the temperature of the water in the said cylinder A.

The cylinder B is filled with bone-black and the space E with water, which is heated to 160°, or any temperature desired or required, after which the feed-pump is started, and the solution for filtration is forced, through the feed-pipe j, into the conical part of vessel B, and, when it is full, up through the bone-black in vessel B, and, through the discharge-pipe k, to a receiver or tank. The deposit which will fall into the apex of the inverted cone of vessel B may at any time be drawn off, by the stop-cock C without interfering with the working of the filter. A large amount of solid matter, principally salts of lime, is deposited in the apex of the inverted cone, the same having become insoluble in its passage through the hot water surrounding the feed-pipe; hence the necessity of the draw-off cock. When the filter requires washing down it is done through the apex of the cone of vessel B, the water in the annular space E being heated to 200°. The saccharine matter in the bone-black will be washed out with much less water than is required in the ordinary filters.

Constant use of my filters side by side with the same number of the ordinary ones has demonstrated the fact that they will make the finest qualities of sugar from ordinary Cuba molasses, which cannot be made at all with the ordinary filters; and, further, that the improved filters render a given amount of bone-black three times as effective as the ordinary filter; and, further, that these filters are washed down in much less time from the facility of keeping them nearly or quite up to the temperature of boiling water, and that this fact involves a much smaller loss from diluted "sweet water."

Having described my invention, what I claim as new, and desire to secure by Letters Patent, is—

1. A filter or purifier composed of the cylinders A and B, the inner one being filled with bone-black or other purifying agent, and the outer one with water to be heated, substantially as set forth.

2. The inverted cone at the bottom of the vessel B, into which the solution to be filtered is first received before passing up through the bone-black or purifying agent, substantially as described.

3. The feed-pipe j, immersed in hot water, substantially as and for the purpose described.

4. The draw-off cock C, substantially as and for the purpose described.

5. The combination of the vessels A and B, hot-water chamber E, feed-pipe j, and steam heating or blow-up pipe G, substantially as and for the purpose set forth.

SAMUEL H. GILMAN.

Witnesses:
MAUNSEL W. CHAPMAN,
CHARLES K. HALL.